US010847000B2

(12) United States Patent
Rahut et al.

(10) Patent No.: US 10,847,000 B2
(45) Date of Patent: Nov. 24, 2020

(54) APPARATUS AND METHOD FOR GEO-FENCED ROUTING INSIDE TERMINALS

(71) Applicant: Honeywell International Inc., Morris Plains, NJ (US)

(72) Inventors: Nagabhushan Rahut, Bangalore (IN); Narendra Kumar Venkata Nagalla, Bangalore (IN); Amol Gandhi, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 12 days.

(21) Appl. No.: 16/034,551

(22) Filed: Jul. 13, 2018

(65) Prior Publication Data
US 2019/0130709 A1 May 2, 2019

Related U.S. Application Data

(60) Provisional application No. 62/580,871, filed on Nov. 2, 2017.

(51) Int. Cl.
| | |
|---|---|
| *G08B 13/00* | (2006.01) |
| *G01C 21/20* | (2006.01) |
| *G07C 9/22* | (2020.01) |
| *G07C 9/27* | (2020.01) |
| *G07C 9/32* | (2020.01) |

(52) U.S. Cl.
CPC ........... *G08B 13/00* (2013.01); *G01C 21/206* (2013.01); *G07C 9/22* (2020.01); *G07C 9/27* (2020.01); *G07C 9/32* (2020.01)

(58) Field of Classification Search
CPC .. G08B 13/00; G01C 21/206; G07C 9/00031; G07C 9/00134
USPC ........................................................ 340/541
See application file for complete search history.

(56) References Cited

U.S. PATENT DOCUMENTS

| 8,590,013 | B2 * | 11/2013 | Crawford | ................ G06F 21/34 |
|---|---|---|---|---|
| | | | | 380/247 |
| 8,610,600 | B1 * | 12/2013 | Sobel | ................ G08B 21/0225 |
| | | | | 340/989 |
| 9,354,067 | B2 * | 5/2016 | Chao | ...................... G01C 21/30 |
| 2005/0075116 | A1 * | 4/2005 | Laird | ....................... A61B 5/04 |
| | | | | 455/456.3 |
| 2005/0131645 | A1 * | 6/2005 | Panopoulos | ......... G05D 1/0244 |
| | | | | 701/472 |

(Continued)

OTHER PUBLICATIONS

Honeywell Enraf, "Terminal Manager Managing your Operations," Honeywell International Inc., Nov. 2013, 8 pages.
Wikipedia, "Geo-fence," Sep. 2017, 3 pages.

*Primary Examiner* — Nay Tun

(57) ABSTRACT

A method includes, responsive to identifying a user entering a terminal, identifying a role for the user. The method also includes providing a routing map to a mobile device associated with the user. The routing map identifies an allowable route for the user within the terminal, and the routing map is based on the role. The method further includes granting the user access to one or more restricted areas in the terminal, where the one or more restricted areas are located along the allowable route in the routing map. The method may also include monitoring a location of the user to identify a deviation of the user from the allowable route and, responsive to identifying the deviation, generating an alarm.

18 Claims, 4 Drawing Sheets

(56) References Cited

U.S. PATENT DOCUMENTS

| | | | |
|---|---|---|---|
| 2005/0136891 A1* | 6/2005 | Wang | H04L 63/0492 |
| | | | 455/410 |
| 2007/0001904 A1 | 1/2007 | Mendelson | |
| 2007/0198186 A1* | 8/2007 | Realini | B67D 7/348 |
| | | | 701/469 |
| 2009/0043504 A1* | 2/2009 | Bandyopadhyay | G01C 17/38 |
| | | | 701/469 |
| 2010/0134310 A1* | 6/2010 | Zheng | G07C 9/00071 |
| | | | 340/686.6 |
| 2011/0148633 A1* | 6/2011 | Kohlenberg | G06F 21/30 |
| | | | 340/541 |
| 2011/0150272 A1* | 6/2011 | GunasekaranBabu | |
| | | | G06K 9/00771 |
| | | | 382/103 |
| 2011/0276338 A1* | 11/2011 | Warner | G16H 40/20 |
| | | | 705/2 |
| 2012/0098638 A1* | 4/2012 | Crawford | G06F 21/34 |
| | | | 340/5.6 |
| 2013/0166198 A1* | 6/2013 | Funk | G01C 21/165 |
| | | | 701/446 |
| 2014/0320121 A1* | 10/2014 | Perttunen | G01C 21/08 |
| | | | 324/244 |
| 2015/0062123 A1* | 3/2015 | Yuen | G06T 19/20 |
| | | | 345/420 |
| 2015/0163626 A1* | 6/2015 | Zimmer | H04W 4/029 |
| | | | 455/404.2 |
| 2015/0168159 A1* | 6/2015 | Chao | G01C 21/30 |
| | | | 701/428 |
| 2015/0364142 A1* | 12/2015 | Sankaranarayanan | |
| | | | G06F 21/32 |
| | | | 704/275 |
| 2017/0032316 A1* | 2/2017 | Benedict | G06Q 10/0833 |
| 2018/0216941 A1* | 8/2018 | Zhu | G05D 1/0282 |

\* cited by examiner

APPARATUS AND METHOD FOR GEO-FENCED ROUTING INSIDE TERMINALS

CROSS-REFERENCE TO RELATED APPLICATION AND PRIORITY CLAIM

This application claims priority under 35 U.S.C. § 119(e) to U.S. Provisional Patent Application No. 62/580,871 filed on Nov. 2, 2017. This provisional application is hereby incorporated by reference in its entirety.

TECHNICAL FIELD

This disclosure generally relates to terminal automation solutions. More specifically, this disclosure relates to an apparatus and method for geo-fenced routing inside terminals.

BACKGROUND

Throughout history, the shipment and distribution of goods have been essential. Movement of goods from one location to another often involves the loading or unloading of cargo at warehouses, ports, storage or distribution terminals, industrial processing facilities, or other facilities (generally referred to as "terminals"). Within a terminal, cargo is unloaded from and loaded onto cargo transporting vehicles, such as trucks, trains, or ships. Due to the frequent arrival and departure of many cargo transporting vehicles and a limited number of locations where cargo can be loaded or unloaded (generally referred to as "bays"), some terminals have deployed terminal automation systems. These terminal automation systems are typically designed to manage and schedule the loading and unloading of cargo involving numerous cargo transporting vehicles.

Safety inside a terminal is of paramount importance, and the desire to increase the safety inside a terminal is ever-increasing. Any compromise in safety could result in a loss to a terminal, such as a financial loss or a loss to a brand image. In an increasingly cyber-industrial world, Industrial Internet of Things (IIoT) is gaining much attention and allows a large amount of data to be collected from devices operating in various systems, such as within terminals themselves or within industrial process control and automation systems or other systems associated with the terminals. However, IIoT devices can expose various systems to high cyber-security risks. These cyber-security risks are not limited to external attackers but can also involve internal disgruntled employees, vendors, third-party agencies, or other parties that have access to assets or information within a system.

SUMMARY

This disclosure provides an apparatus and method for geo-fenced routing inside terminals.

In a first embodiment, a method includes, responsive to identifying a user entering a terminal, identifying a role for the user. The method also includes providing a routing map to a mobile device associated with the user. The routing map identifies an allowable route for the user within the terminal, and the routing map is based on the role. The method further includes granting the user access to one or more restricted areas in the terminal, where the one or more restricted areas are located along the allowable route in the routing map.

In a second embodiment, an apparatus includes at least one processor configured, responsive to identifying a user entering a terminal, to identify a role for the user. The at least one processor is also configured to provide a routing map to a mobile device associated with the user. The routing map identifies an allowable route for the user within the terminal, and the routing map is based on the role. The at least one processor is further configured to grant the user access to one or more restricted areas in the terminal, where the one or more restricted areas are located along the allowable route in the routing map.

In a third embodiment, a non-transitory computer readable medium contains instructions that when executed cause at least one processing device, responsive to identifying a user entering a terminal, to identify a role for the user. The medium also contains instructions that when executed cause the at least one processing device to provide a routing map to a mobile device associated with the user. The routing map identifies an allowable route for the user within the terminal, and the routing map is based on the role. The medium further contains instructions that when executed cause the at least one processing device to grant the user access to one or more restricted areas in the terminal, where the one or more restricted areas are located along the allowable route in the routing map.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
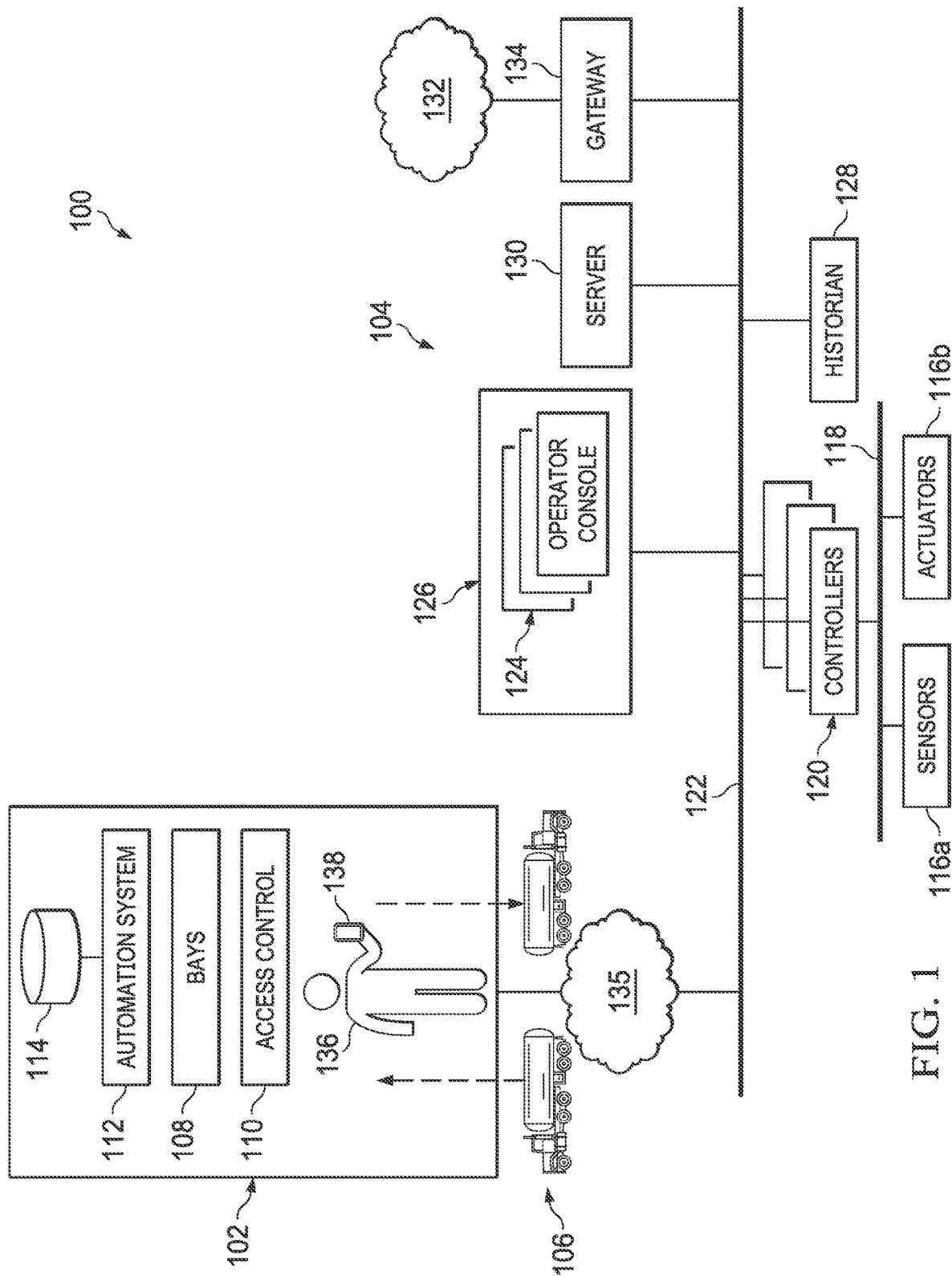
FIG. 1 illustrates an example system for geo-fenced routing inside a terminal according to this disclosure.

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, safety inside a terminal is of paramount importance, and the desire to increase the safety inside a terminal is ever-increasing. However, with the proliferation of Industrial Internet of Things (IIoT) devices and other devices vulnerable to cyber-security threats, maintaining the integrity of assets and information within a terminal or any associated systems or facilities (such as related industrial process control and automation systems) is becoming more and more difficult. One reason for this difficulty is that numerous people may enter and exit a terminal during any given period of time. These people can include terminal operators who operate equipment or perform other functions within a terminal, technicians who service equipment within the terminal, managers or administrators who oversee operations within the terminal, and drivers or other personnel who navigate cargo vehicles into and out of the terminal. Any of these people or others could engage in malicious acts that compromise the safety of the terminal or that pose cybersecurity risks to the terminal or any related facilities.

This disclosure provides techniques for controlling the movements of people to assigned areas within a terminal so that those people have access only to specific areas of the terminal and to specific assets in those areas. As a result, each person may be granted limited access only to one or more specific areas of a terminal, which can help to prevent people from performing malicious acts after accessing areas of the terminal in which they are not allowed to enter. Also, each person can have a mobile device (such as a mobile telephone, smartphone, or tablet computer) on which at least one routing map is displayed. Each routing map identifies one or more pathways through the terminal that the person is expected to follow in order to successfully complete some activity or operation within the terminal.

The routing maps are geo-tagged, meaning the routing maps include geographically-identifying information like latitude/longitude or other coordinates. Each person's mobile device could use the mobile device's position (such as its GPS coordinates) to show where that person's mobile device is located relative to the associated routing map. This enables each person to verify whether he or she is following the correct path identified by a routing map. Moreover, a terminal automation system or other system can track each person or each person's mobile device and determine if a person deviates from an assigned route. If so, the terminal automation system or other system can generate an alarm, which could be monitored from a control room or other location. The alarm allows appropriate action to be taken, such as dispatching security personnel.

Access to the routing maps can be given based on the role that each person has inside a terminal or an associated system. For example, the routing maps provided to each person can vary based on whether that person is a terminal operator, technician, manager, administrator, or driver. One or more maps could be loaded onto a person's mobile device, such as when that person first enters the terminal, based on a role identified by the person's mobile device. The person can then use his or her mobile device to easily understand the route or routes within the terminal that are permissible. The mobile device could optionally also be used with one or more access control mechanisms along each permissible route, such as when gates, doors, or other structures along the permissible routes can only be opened by the person using his or her mobile device.

In this way, the described approaches help to limit access to different areas of a terminal, which can help to reduce the ability of bad actors to perform malicious or unintended activities within the terminal. Also, the described approaches can help to reduce unwanted movements of personnel inside a terminal and can help personnel to travel to designated locations immediately and perform their tasks quickly. This improves terminal operations and terminal efficiency and helps to address safety issues, such as by controlling people and vehicle traffic with the terminal.

FIG. 1 illustrates an example system 100 for geo-fenced routing inside a terminal 102 according to this disclosure. In the specific example shown in FIG. 1, the terminal 102 is described as being used in conjunction with an industrial process control and automation system 104. However, the terminal 102 could be used in conjunction with any other suitable system or no other systems.

As shown in FIG. 1, the system 100 includes or is used in conjunction with at least one cargo terminal 102. Each cargo terminal 102 generally represents any suitable structure used to receive, store, and distribute one or more products, such as a warehouse, port, storage or distribution terminal, industrial processing facility, or other facility. Each cargo terminal 102 receives cargo from or provides cargo to a number of cargo vehicles 106, such as trucks, trains, ships, or pipelines. The cargo could come from any number of sources and be delivered to any number of destinations. Each terminal 102 typically includes at least one area containing equipment or other assets (such as sensor equipment, storage tanks, etc.) where access may be restricted to at least one or more portions of the area.

In the example shown in FIG. 1, the cargo terminal 102 includes a number of bays 108, which represent areas or locations where the cargo vehicles 106 can travel. Each bay 108 could represent a portion of a warehouse, port, or other larger area where cargo can be loaded or unloaded. The cargo terminal 102 may also include various access controls 110, which control where users and cargo vehicles 106 are allowed to enter or exit the cargo terminal 102 or a portion of the cargo terminal 102. For instance, the access controls 110 could be used to limit and control access by users or cargo vehicles 106 to the bays 108. Any suitable access controls 110 could be used to allow personnel or cargo vehicles 106 to enter and exit a cargo terminal or a portion thereof. Example types of access controls 110 could include security gates and door locks having associated radio frequency identification (RFID) readers, barcode/QR code readers, or biometric scanners.

As noted above, due to the frequent arrival and departure of many cargo vehicles 106 and a limited number of cargo bays 108, some cargo terminal 102 have deployed terminal automation systems 112. The terminal automation system 112 is typically designed to manage and schedule the loading and unloading of cargo involving the cargo vehicles 106 and the bays 108. For example, the terminal automation system 112 could generate schedules identifying when different cargo vehicles 106 are allowed to load or unload cargo at various bays 108 in a cargo terminal 102. The terminal automation system 112 could also track other information, such as information about drivers or vehicles. The terminal automation system 112 can store information in and retrieve information from at least one database 114.

The terminal automation system 112 includes any suitable structure for automating one or more operations in a cargo terminal. In some embodiments, the terminal automation system 112 represents a computing device that executes the TERMINAL MANAGER software from HONEYWELL INTERNATIONAL INC. in order to automate terminal operations like cargo loading and unloading. The TERMINAL MANAGER software addresses various kinds of transportation modes, such as road, rail, marine, and pipeline transport. The TERMINAL MANAGER software interfaces with field-level controllers called "Batch Control Units" (BCUs) using the HONEYWELL EXPERION distributed control system and to business systems such as enterprise resource planning (ERP) applications. The TERMINAL MANAGER software facilitates the movement of data from business systems to DCS systems and vice versa. The TERMINAL MANAGER software is highly configurable and extensible. For instance, each terminal is typically unique, and workflows often vary from terminal to terminal.

The TERMINAL MANAGER software is designed to address terminal-specific needs by having both configurability and extensibility. This helps users to configure functionality related to entry gates, exit gates, waiting areas, weighting areas, or other areas for the needs of specific terminals. Also, there may be unique requirements to add various extra parameters for validation, which again typically varies from terminal to terminal. To address this need, the TERMINAL MANAGER software has built-in capabilities for extensibility both at the user interface (UI) level and at the parameter level. Note, however, that any other suitable terminal automation systems 112 could be used here.

The database 114 includes any suitable structure for storing and facilitating retrieval of information used by a terminal automation system. For example, the database 114 can be used to store schedules, routing maps, and other data used by the terminal automation system 112 to manage the operations of the terminal 102. Note that while shown here as being local to the terminal automation system 112, the database 114 could reside in any suitable location(s) accessible by the terminal automation system 112.

The industrial process control and automation system 104 in this example includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner. The process system here could operate using cargo delivered to the terminal 102 or provide cargo to the terminal 102 for delivery elsewhere.

In FIG. 1, the system 100 includes one or more sensors 116a and one or more actuators 116b. The sensors 116a and actuators 116b represent components in a process system that may perform any of a wide variety of functions. For example, the sensors 116a could measure a wide variety of characteristics in the process system, such as flow, pressure, or temperature. Also, the actuators 116b could alter a wide variety of characteristics in the process system, such as valve openings. Each of the sensors 116a includes any suitable structure for measuring one or more characteristics in a process system. Each of the actuators 116b includes any suitable structure for operating on or affecting one or more conditions in a process system.

At least one network 118 is coupled to the sensors 116a and actuators 116b. The network 118 facilitates interaction with the sensors 116a and actuators 116b. For example, the network 118 could transport measurement data from the sensors 116a and provide control signals to the actuators 116b. The network 118 could represent any suitable network or combination of networks. As particular examples, the network 118 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 120. The controllers 120 can be used in the system 100 to perform various functions in order to control one or more industrial processes. For example, a first set of controllers 120 may use measurements from one or more sensors 116a to control the operation of one or more actuators 116b. A second set of controllers 120 could be used to optimize the control logic or other operations performed by the first set of controllers. A third set of controllers 120 could be used to perform additional functions. The controllers 120 could therefore support a combination of approaches, such as regulatory control, advanced regulatory control, supervisory control, and advanced process control.

Each controller 120 includes any suitable structure for controlling one or more aspects of an industrial process. At least some of the controllers 120 could, for example, represent proportional-integral-derivative (PID) controllers or multivariable controllers, such as controllers implementing model predictive control (MPC) or other advanced predictive control (APC). As a particular example, each controller 120 could represent a computing device running a real-time operating system, a WINDOWS operating system, or other operating system. At least one of the controllers 120 shown in FIG. 1 could represent a model-based controller that operates using one or more process models. For example, each of the controllers 120 could operate using one or more process models to determine, based on measurements from one or more sensors 116a, how to adjust one or more actuators 116b.

At least one network 122 couples the controllers 120 and other devices in the system 100. The network 122 facilitates the transport of information between components. The network 122 could represent any suitable network or combination of networks. As particular examples, the network 122 could represent at least one Ethernet network.

Operator access to and interaction with the controllers 120 and other components of the system 100 can occur via various operator consoles 124. Each operator console 124 could be used to provide information to an operator and receive information from an operator. For example, each operator console 124 could provide information identifying a current state of an industrial process to the operator, such as values of various process variables and warnings, alarms, or other states associated with the industrial process. Each operator console 124 could also receive information affecting how the industrial process is controlled, such as by receiving setpoints or control modes for process variables controlled by the controllers 120 or other information that alters or affects how the controllers 120 control the industrial process. Each operator console 124 includes any suitable structure for displaying information to and interacting with an operator. For example, each operator console 124 could represent a computing device running a WINDOWS operating system or other operating system.

Multiple operator consoles 124 can be grouped together and used in one or more control rooms 126. Each control room 126 could include any number of operator consoles 124 in any suitable arrangement. In some embodiments, multiple control rooms 126 can be used to control an industrial plant, such as when each control room 126 contains operator consoles 124 used to manage a discrete part of the industrial plant.

The control and automation system 104 here may optionally include at least one historian 128 and/or one or more servers 130. The historian 128 represents a component that stores various information about the system 100. The historian 128 could, for instance, store information that is generated by the various controllers 120 during the control of one or more industrial processes. The historian 128 includes any suitable structure for storing and facilitating retrieval of information. Although shown as a single component here, the historian 128 could be located elsewhere in the system 100, or multiple historians could be distributed in different locations in the system 100.

Each server 130 represents a computing device that executes applications for users of the operator consoles 124 or other applications. The applications could be used to support various functions for the operator consoles 124, the controllers 120, or other components of the system 100. Each server 130 could represent a computing device running a WINDOWS operating system or other operating system. Note that while shown as being local within the control and automation system 104, the functionality of the server 130 could be remote from the control and automation system 104. For instance, the functionality of the server 130 could be implemented in a computing cloud 132 or a remote server communicatively coupled to the control and automation system 104 via a gateway 134. Although not shown here, components associated with the terminal 102 (such as the terminal automation system 112) could also communicate with the computing cloud 132 or a remote server, either directly or indirectly through the control and automation system 104.

If needed or desired, one or more networks 135 could be used to support communications between components of the terminal 102 and components of the control and automation system 104. This may allow, for example, information generated by the terminal automation system 112 (such as personnel access, cargo transfers, or other information) to be provided to the historian 128 for storage or to other components for use. Note, however, that the network 135 may not be needed if the components of the terminal 102 and the control and automation system 104 are integrated. As an example, the terminal automation system 112 could be coupled to one of the networks 122 in the system 104. As another example, the terminal automation system 112 could be implemented using an operator console 124, a server 130, or a computing cloud 132 or remote server. In general, there are various ways in which the functionalities of the components of the terminal 102 and the control and automation system 104 could be implemented, including ways that are completely separated, ways that are completely integrated, and ways that are partially integrated.

It should be noted once again that the system 100 need not include an industrial process control and automation system 104 that is used in conjunction with a terminal 102. One or more terminals 102 could be used with at least one terminal automation system 112 separate from any industrial process control and automation system. The one or more terminals 102 could be used in conjunction with any other suitable systems or no other systems.

At least one component of the system 100 supports a mechanism for geo-fencing inside one or more terminals 102. For example, this functionality can be provided by at least one terminal automation system 112, which may be implemented as a stand-alone component or integrated into other components (such as an operator console 124, server 130, computing cloud 132, or remote server). As described in more detail below, the terminal automation system 112 supports techniques for controlling the movements of users 136 or associated objects (such as cargo vehicles 106) to assigned areas within a terminal 102. For instance, the terminal automation system 112 can grant each user 136 limited access only to one or more specific areas of the terminal 102 based on that user's role.

The terminal automation system 112 can also provide one or more routing maps for presentation on a mobile device 138 used by each user 136. Each routing map can identify where the associated user 136 is expected to travel within the terminal 102 in order to successfully complete an activity or operation within the terminal 102. Access to one or more routing maps can be granted by the terminal automation system 112 when a user 136 enters the terminal 102. The specific routing map(s) provided to each user 136 could be based on the role associated with that user 136, such as operator, technician, manager, administrator, or driver. Once loaded onto each user's mobile device 138, that user 136 can use the routing map to identify where that user 136 is allowed to move within the terminal 102. Each user's mobile device 138 could optionally be carried by the user 136 and used as part of the access controls 110. For instance, gates, doors, or other access controls 110 could include RFID, barcode, or QR code readers that operate based on signals, images, or other information provided by each user's mobile device 138. Of course, other or additional access controls 110, such as biometric scanners, could also be used.

As each user 136 or vehicle 106 moves within the terminal 102, the location of that user 136 or vehicle 106 can be tracked. There are various techniques to track the users 136 or the vehicles 106, including those that do and do not rely on the location-sensing capabilities of the mobile devices 138, and any of these techniques can be supported in the system 100. The terminal automation system 112 can compare the actual location or route taken by each user 136 or vehicle 106 to the routing map that the user 136 or vehicle 106 should be following. If the user 136 or vehicle 106 deviates from an assigned route (such as by a threshold distance or percentage), the terminal automation system 112 could generate an alarm, which can then be displayed on an operator console 124 or other device(s). The alarm allows security or other personnel to be dispatched, information about the user 136 or vehicle 106 to be recorded and logged, or other actions to take place.

In some embodiments, the routing maps used by the terminal automation system 112 could be pre-defined. For example, personnel associated with the terminal 102 could identify the typical path that should be traversed through the terminal 102 for each of multiple user roles, and routing maps identifying those typical paths could be generated and stored in the database 114 for later use. In other embodiments, the terminal automation system 112 or other system could dynamically generate one or more routing maps. For instance, the terminal automation system 112 or other system could generate a routing map identifying the path that a driver of a vehicle 106 should take in order to reach a specified bay 108 in the terminal 102. In general, routing maps can be generated in any suitable manner for use in the system 100. As a particular example, the routing maps can be prepared based on specific objectives, such as when a route used to pick up an asset involves traveling between an entry gate and the asset and then to an exit. As another particular example, if a technician is checking assets in a terminal 102, the route may include access to all areas, access to only certain areas at certain times of day, or access to only a set number of assets at any one point in time (that is, once a technician finishes a check of one asset, another asset and a new route could be defined and provided to the technician along with new access permissions).

Although FIG. 1 illustrates one example of a system 100 for geo-fenced routing inside a terminal 102, various changes may be made to FIG. 1. For example, the system 100 could include any number of terminals, bays, access controls, automation systems, databases, sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs, such as when the terminal automation system 112 or the historian 128 are implemented in the computing cloud 132. Further, particular functions have been described as being performed by particular components of the system 100. This is for illustration only. In general, terminals and control and automation systems are highly configurable and can be configured in any suitable manner according to particular needs. In addition, FIG. 1 illustrates one example operational environment where user access in a terminal can be restricted. This functionality can be used in any other suitable system.

Figure 2:
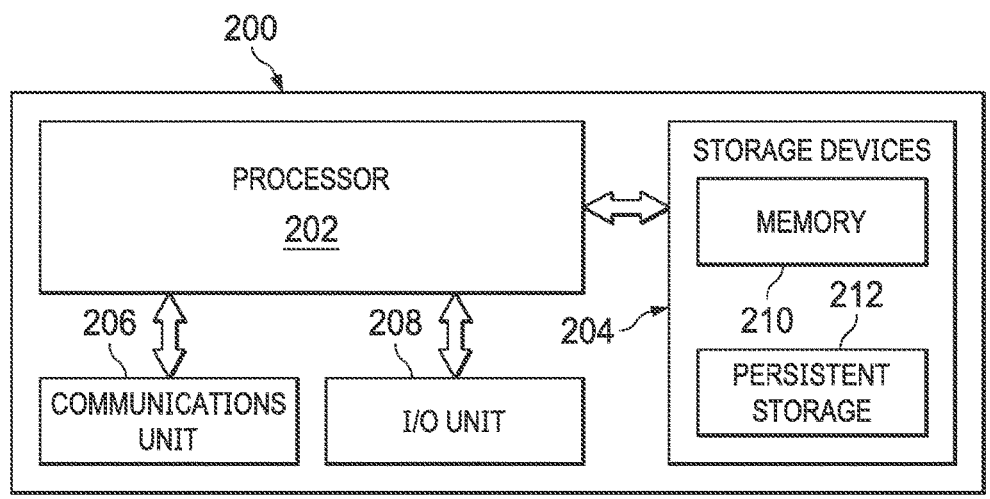
FIG. 2 illustrates an example device for identifying routes to support geo-fenced routing inside a terminal according to this disclosure.

FIG. 2 illustrates an example device 200 for identifying routes to support geo-fenced routing inside a terminal according to this disclosure. The device 200 could, for example, represent the terminal automation system 112, operator console 124, server 130, or device used in the computing cloud 132 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions when executed can be used to restrict user access in a terminal 102 as described in this patent document. For example, the instructions when executed can cause the processor 202 to identify different users 136, mobile devices 138, or vehicles 106 entering a terminal 102, identify roles for the users, select routing maps for the users, and provide the routing maps to the mobile devices 138. The instructions when executed can also cause the processor 202 to track the users 136, mobile devices 138, or vehicles 106, detect any deviations from the routing maps, and generate alarms or take other actions when deviations are detected. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for identifying routes to support geo-fenced routing inside a terminal, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
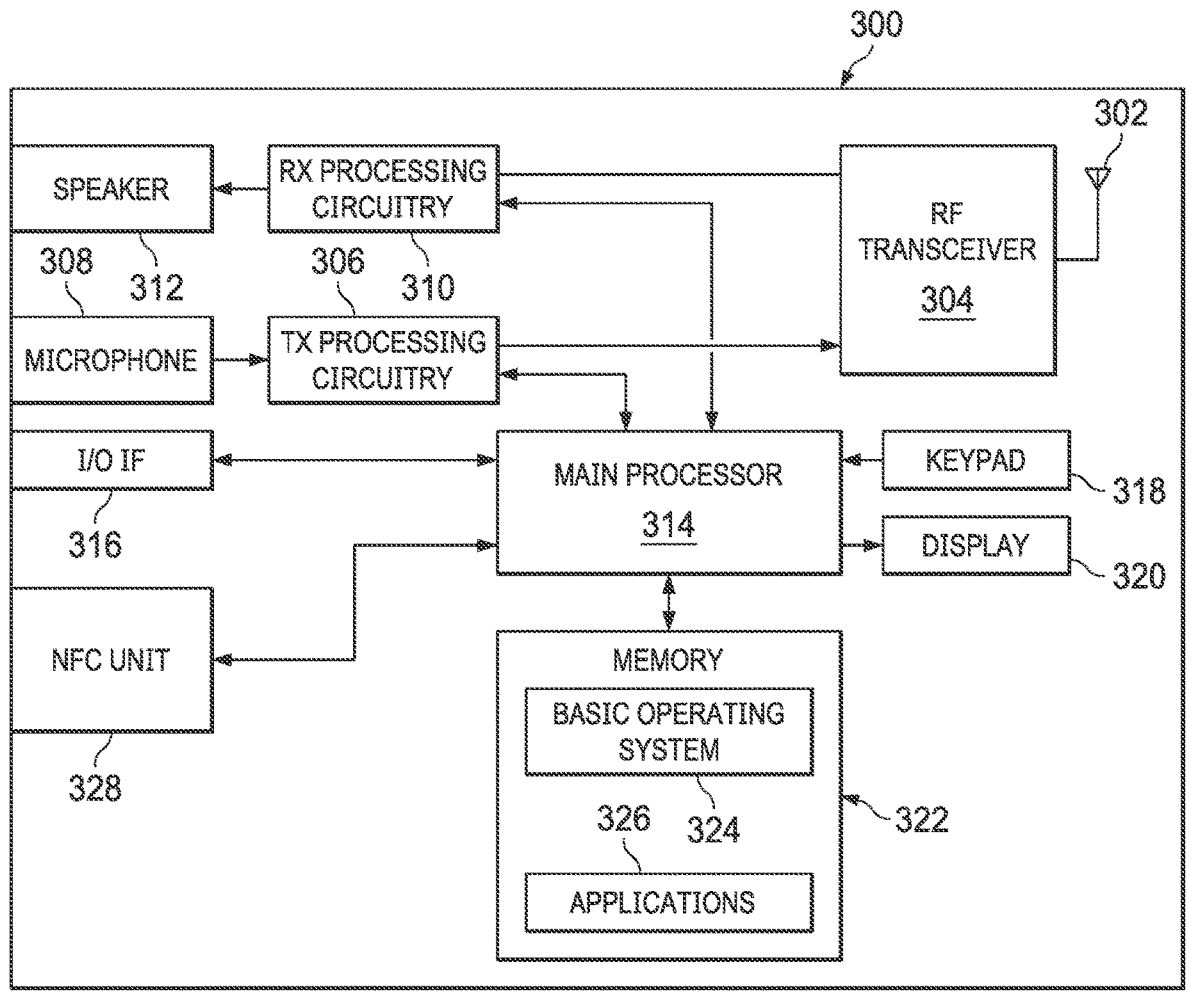
FIG. 3 illustrates an example mobile device for receiving routes to support geo-fenced routing inside a terminal according to this disclosure.

FIG. 3 illustrates an example mobile device 300 for receiving routes to support geo-fenced routing inside a terminal according to this disclosure. The mobile device 300 could, for example, represent a mobile device 138 used by a user 136 in the system 100 of FIG. 1. However, the mobile device 300 could be used in any other suitable system.

As shown in FIG. 3, the mobile device 300 includes an antenna 302, a radio frequency (RF) transceiver 304, transmit (TX) processing circuitry 306, a microphone 308, and receive (RX) processing circuitry 310. The mobile device 300 also includes a speaker 312, a main processor 314, an input/output (I/O) interface (IF) 316, a keypad 318, a display 320, and a memory 322. The memory 322 includes a basic operating system (OS) program 324 and one or more applications 326. In addition, the mobile device 300 could include a near-field communication (NFC) unit 328.

The RF transceiver 304 receives, from the antenna 302, an incoming RF signal, such as a cellular or WiFi signal. The RF transceiver 304 down-converts the incoming RF signal to generate an intermediate frequency (IF) or baseband signal. The IF or baseband signal is sent to the RX processing circuitry 310, which generates a processed baseband signal by filtering, decoding, and/or digitizing the baseband or IF signal. The RX processing circuitry 310 transmits the processed baseband signal to the speaker 312 (such as for voice data) or to the main processor 314 for further processing (such as for routing map data).

The TX processing circuitry 306 receives analog or digital voice data from the microphone 308 or other outgoing baseband data (such as chat data) from the main processor 314. The TX processing circuitry 306 encodes, multiplexes, and/or digitizes the outgoing baseband data to generate a processed baseband or IF signal. The RF transceiver 304 receives the outgoing processed baseband or IF signal from the TX processing circuitry 306 and up-converts the baseband or IF signal to an RF signal that is transmitted via the antenna 302.

The main processor 314 can include one or more processors or other processing devices and execute the basic OS program 324 stored in the memory 322 in order to control the overall operation of the mobile device 300. For example, the main processor 314 could control the reception of forward channel signals and the transmission of reverse channel signals by the RF transceiver 304, the RX processing circuitry 310, and the TX processing circuitry 306 in accordance with well-known principles. In some embodiments, the main processor 314 includes at least one microprocessor or microcontroller.

The main processor 314 is also capable of executing other processes and applications 326 resident in the memory 322. For example, the main processor 314 could execute an application 326 that receives one or more routing maps (such as from the device 200) and presents each routing map on the display 320. The main processor 314 can move data into or out of the memory 322 as required by an executing application 326. The main processor 314 is also coupled to the I/O interface 316, which provides the mobile device 300 with the ability to connect to other devices such as laptop computers and handheld computers. The I/O interface 316 is the communication path between these accessories and the main processor 314.

The main processor 314 is also coupled to the keypad 318 and the display 320. The operator of the mobile device 300 can use the keypad 318 to enter data into the mobile device 300. The display 320 may be a liquid crystal display or other display capable of rendering text and/or at least limited graphics, such as one or more routing maps. Note that if the display 320 denotes a touch screen capable of receiving input, fewer or not buttons or keypads may be needed.

The memory 322 is coupled to the main processor 314. Part of the memory 322 could include a random access memory, and another part of the memory 322 could include a Flash memory or other read-only memory.

The NFC unit 328 facilitates interactions between the mobile device 300 and other nearby devices, such as access controls 110. The NFC unit 328 supports any suitable near-field communication technique or other short-range communication technique. Note, however, that the NFC unit 328 need not be used in the mobile device 300 and that access control can occur using other functions of the mobile device 300 (or even in ways not involving the mobile device 300). For instance, the mobile device 300 could present a barcode, QR code, or other visual code on the display 320 that can be sensed by one or more access controls 110. A wide variety of access controls can be used for users and vehicles (with and without involving the mobile device 300), and any suitable access control techniques can be used here.

Although FIG. 3 illustrates one example of a mobile device 300 for receiving routes to support geo-fenced routing inside a terminal, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). As another particular example, the mobile device 300 here generally represents a smartphone or other device supporting voice and data communications. However, other mobile devices (such as tablet computers or navigation systems) need not include the ability to support voice communications. Also, mobile devices come in a wide variety of configurations, and FIG. 3 does not limit this disclosure to any particular mobile device.

Figure 4:
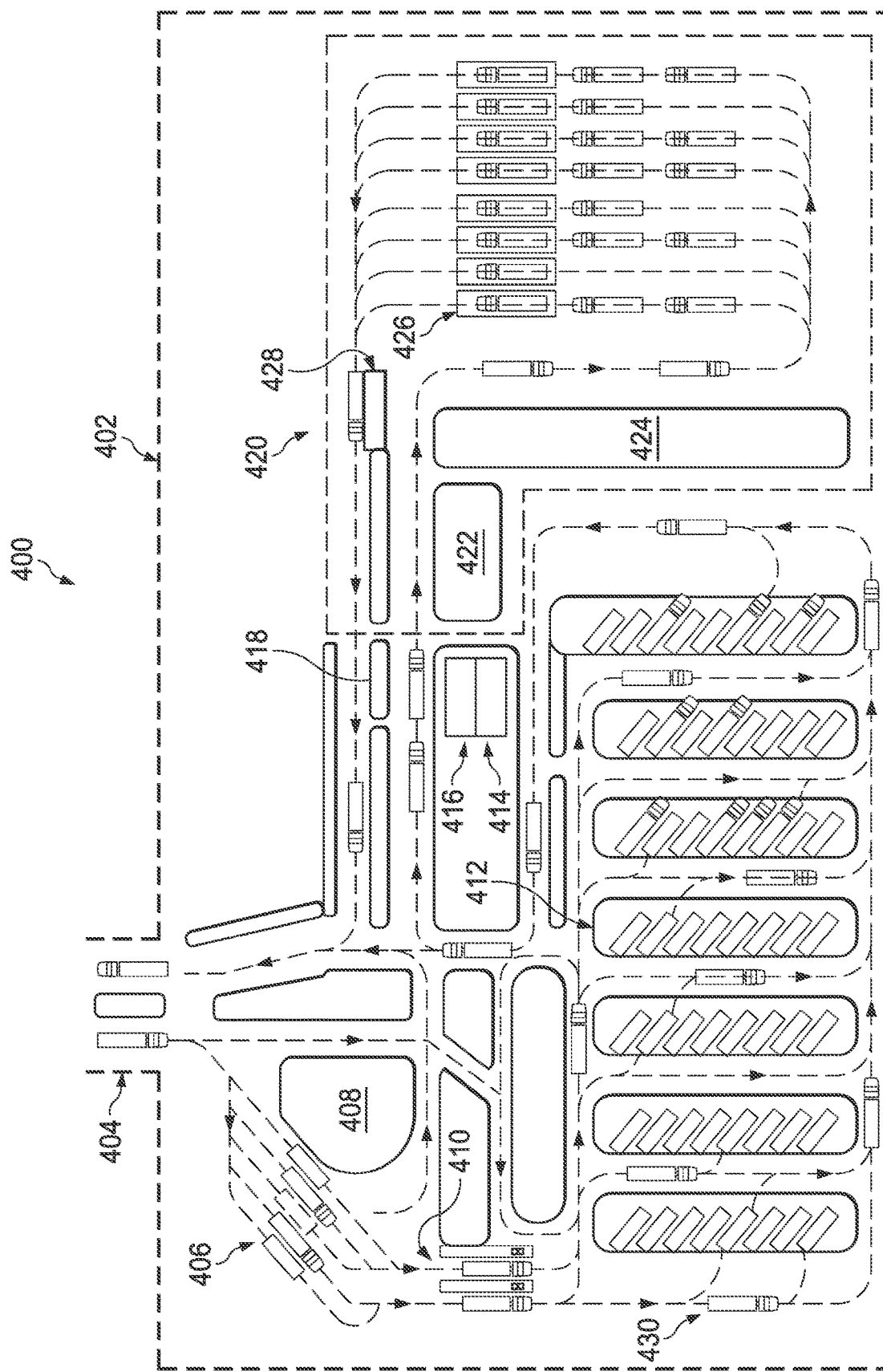
FIG. 4 illustrates an example terminal in which geo-fenced routing is supported in according to this disclosure.

FIG. 4 illustrates an example terminal 400 in which geo-fenced routing is supported in according to this disclosure. The terminal 400 could, for example, represent the terminal 102 and be part of the system 100 shown in FIG. 1. However, the terminal 400 could be used in any other suitable system. Operations discussed above with reference to FIG. 1 may be carried out in the terminal 400 using the devices 200 and 300 shown in FIGS. 2 and 3. However, these operations may be carried out using any other suitable devices.

As shown in FIG. 4, the terminal 400 is generally defined by an outer boundary 402, which could define the general area of a warehouse, port, storage or distribution terminal, industrial processing facility, or other facility in which terminal operations are performed. The terminal 400 includes at least one entrance/exit 404 through which vehicles can enter and exit the terminal 400. Vehicles entering the terminal 400 can stop in an inspection area 406 near an inspection office 408. Inspected and approved vehicles can pass through at least one entry gate 410 and, if necessary, park in one or more parking areas 412 to await a time to load or unload cargo. Each entry gate 410 could include RFID readers, barcode/QR code readers, biometric scanners, or other access control devices. If desired, waiting drivers can enter a driver room 414, which may include at least one display showing one or more queues for bays in the terminal 400. Access to the driver room 414 could be controlled, such as by using barcode/QR code readers or biometric scanners. Drivers or other personnel could also interact with salespeople in a sales office 416.

Once a driver is allowed to load or unload cargo in the terminal 400, the driver can maneuver his or her vehicle to a security guard station 418. If allowed, the vehicle can then enter a restricted area 420 of the terminal 400, which in this example represents a gantry boundary. The restricted area 420 here can include one or more buildings 422 used by technicians, managers, administrators, or other personnel. The restricted area 420 here can also include an operations and maintenance building 424 used by various personnel. In this example, the bays of the terminal 400 are defined as different gantry locations 426 where one or more gantries can load cargo onto or remove cargo from the vehicles. Each gantry location 426 could include an RFID reader or other access control devices. Vehicles exit the restricted area 420 through an exit gate 428, where a bill of lading (BOL) or other documentation could be provided to the driver of each vehicle. The exit gate 428 could also include an RFID reader or other access control devices.

Various personnel can enter, work in, and exit different areas of the terminal 400. For example, terminal operators (such as inspectors) or other personnel could work in the inspection office 408, terminal operators (such as salespeople) or other personnel could work in the sales office 416, and terminal operators (such as gantry operators) or other personnel could work in the operations and maintenance building 424. Also, technicians or other personnel could work in the building 422 and in the gantry locations 426 where one or more gantries are maintained. Further, terminal managers and administrators or other personnel could work in the building 422. Drivers may be expected to be present in the inspection area 406, at the entry gate 410, in the parking area 412, in the driver room 414 and sales office 416, and at the gantry locations 426.

These various parties represent different users in the terminal 400 and have different roles in the terminal 400. For example, a driver may not be expected to enter the building 422 or the operations and maintenance building 424. As another example, a salesperson may not be expected to enter the gantry locations 426. As described above, to address internal security threats (both physical and computer-based), movements of users and vehicles within the terminal 400 can be controlled, such as by using the terminal automation system 112 executed by the device 200. Movement of various users and vehicles can be controlled so that those users have access only to assigned areas or assets within the terminal 400, limiting those users' access to other areas and assets within the terminal 400. Access can be provided based on the users' roles, such as terminal operators, technicians, managers, administrators, and drivers. As a result, the roles of the various parties can be used here to limit their access within the terminal 400, which helps to prevent malicious or unintended activities within the terminal 400.

As noted above, routing maps can be created and provided to the various parties' mobile devices. For example, a routing map could have the same general format shown in FIG. 4, where the terminal 400 is represented in some form (such as by using a simplified drawing or a satellite view of the terminal). One or more allowable pathways 430 can be defined in each routing map to identify where a user or an associated vehicle is allowed to travel. In some embodiments, the terminal automation system 112 provides access to the routing maps based on the role of a particular user or vehicle inside the terminal 400. Each routing map is geo-tagged so that the actual location of a user or associated vehicle can be compared to the allowable pathway(s) 430 in order to identify any parties deviating from the expected or allowable travel paths within the terminal 400. In some embodiment, if a user or vehicle deviates from an assigned route, an alarm can be generated, which can be monitored from a control room or other location so that appropriate action can be taken. The use of routing maps in this way helps to reduce unwanted movements of personnel inside a terminal and allows personnel to travel immediately to designated areas to perform tasks quickly. The use of routing maps in this way also helps to improve terminal operations, terminal efficiency, and terminal safety.

The routing maps are loaded into mobile devices (such as devices 300) of various personnel and can be carried inside the different areas of the terminal 400. The mobile devices can be used with access controls that are integrated or otherwise used at the entry gate 410, driver room 414, gantry locations 426, exit gate 428, or other locations within the terminal 400. The routing maps can be loaded automatically on a user's mobile device once the user enters the terminal 400. The routing maps can assist users inside the terminal 400 to understand accessible routes easily. As noted above, the routing maps could be pre-defined or generated dynamically. Pre-defined routing maps could be defined based on specific objectives within the terminal 400 or other factors. Dynamic routing maps could be defined based on dynamically assigned parking spots, gantry locations, travel pathways, or other factors.

In some embodiments, multiple personnel could have the same role and receive the same routing maps and access permissions. For example, all terminal operators could be assigned the same role and receive the same access permissions with respect to different areas of the terminal 400. In other embodiments, the delivery of routing maps can be customized even further, such as when individual terminal operators are assigned to different roles with different routing maps and access permissions. In general, the use of routing maps and associated access permissions can vary in any number of ways as needed or desired.

Although FIG. 4 illustrates one example of a terminal 400 in which geo-fenced routing is supported, various changes may be made to FIG. 4. For example, the specific terminal 400 and allowable pathways 430 shown in FIG. 4 are examples only. A terminal may include a different layout and have different allowable pathways within that layout. As noted above, each terminal is typically unique, so each terminal could have its own unique layout and its own unique allowable pathways for performing actions within that terminal.

Figure 5:
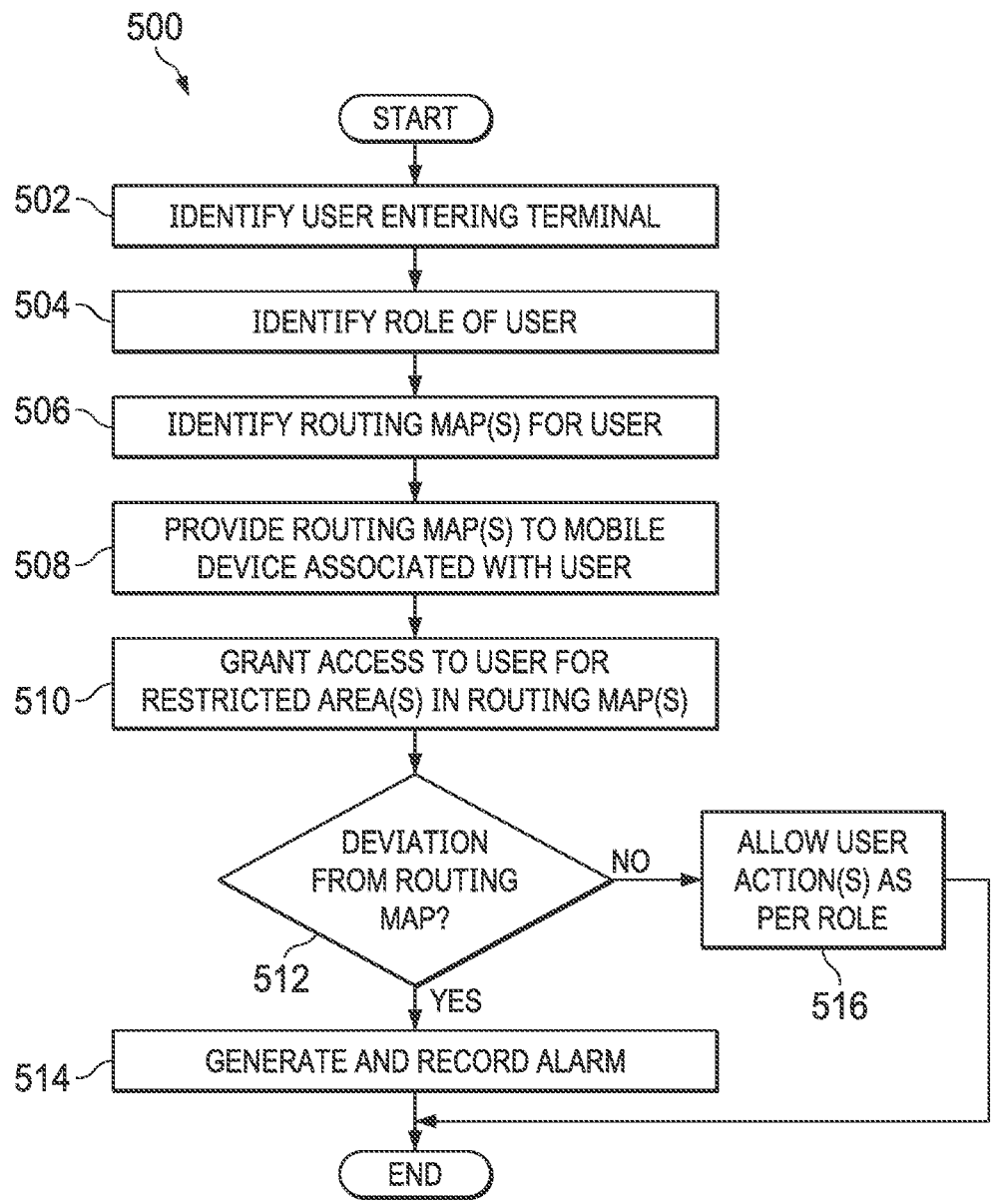
FIG. 5 illustrates an example method for geo-fenced routing inside a terminal according to this disclosure.

FIG. 5 illustrates an example method 500 for geo-fenced routing inside a terminal according to this disclosure. For ease of explanation, the method 500 is described as involving the use of the devices 200 and 300 in FIGS. 2 and 3 with personnel in the terminal 400 of FIG. 4. However, the method 500 could be used with any other suitable devices and in any other suitable terminals/systems.

A user entering a terminal is identified at step 502. This could include, for example, the processor 202 of the device 200 receiving information from the user's mobile device 300 or from the user himself or herself. The information could be collected in any suitable manner, such as by using RFID, barcode, or QR code readers or biometric scanners at the entrance/exit 404 or entry gate 410 of the terminal 400. A role of the user is identified at step 504. This could include, for example, the processor 202 of the device 200 identifying the role that is associated with the previously-identified user. Example roles could include terminal operator, technician, manager, administrator, or driver.

One or more routing maps are identified for the user at step 506. This could include, for example, the processor 202 of the device 200 identifying the routing map or maps to be used by the user based on the identified user role. Each routing map identifies an expected or permissible route within the terminal 400. Each routing map could be pre-defined or dynamically generated, and each routing map could be based on an objective to be accomplished. The one or more routing maps are provided to a mobile device associated with the user at step 508. This could include, for example, the processor 202 of the device 200 transmitting the routing map(s) to the user's mobile device 300. This communication could occur in any suitable manner, such as via cellular, WiFi, or NFC connections.

The user is granted access to one or more restricted areas in the routing map(s) at step 510. This could include, for example, the processor 202 of the device 200 allowing the user to access various areas of the terminal 400 based on the allowable route(s) identified in the routing map(s). A location of the user is monitored to identify any deviation from the allowable route(s) at step 512. This could include, for example, the processor 202 of the device 200 tracking the user's mobile device 300 or vehicle to identify where the user is moving within the terminal 400. If a deviation is identified, an alarm is generated and recorded at step 514. This could include, for example, the processor 202 of the device 200 generating an alarm that is presented on an operator console or other device(s). Corrective action can then occur in response to the alarm, such as dispatching security personnel or recording where the user is moving and what the user is doing. Otherwise, one or more user actions are allowed to occur as per the user's role at step 516. This could include, for example, allowing the user to drive his or her vehicle into certain areas in order to pick up or deliver cargo.

Although FIG. 5 illustrates one example of a method 500 for geo-fenced routing inside a terminal, various changes may be made to FIG. 5. For example, while shown as a series of steps, various steps in FIG. 5 could overlap, occur in parallel, occur in a different order, or occur any number of times. As a particular example, steps 506-512 could occur repeatedly if different routing maps are provided to the user at different times while the user is within the terminal 400. A specific example of this is when a technician moves from asset to asset during inspections, in which case the technician could receive different routing maps identifying allowable routes between different assets.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
responsive to identifying a user in a cargo transporting vehicle entering a terminal that includes a plurality of storage tanks that each store cargo, where the cargo from the plurality of storage tanks is configured for unloading from and loading onto the cargo transporting vehicle, identifying a role for the user;
wirelessly providing a routing map to a mobile device configured for a global positioning system (GPS) including GPS signaling associated with the user, the routing map identifying an allowable route for the user within the terminal, the routing map based on the role;
granting the user access to one or more restricted areas in the terminal while denying the user access to one or more second areas of the terminal, each area of the terminal having an associated access control, the one or more restricted areas located along the allowable route in the routing map,
wherein the one or more restricted areas includes bays where cargo from the cargo transporting vehicle is loaded or removed, and
using the GPS signaling from the mobile device, monitoring a location of the user.

2. The method of claim 1, further comprising:
wherein the monitoring the location of the user is used to identify a deviation of the user from the allowable route; and
responsive to identifying the deviation, generating an alarm.

3. The method of claim 1, further comprising:
responsive to identifying a second user entering the terminal, identifying a second role for the second user; and
providing a second routing map to a second mobile device associated with the second user, the second routing map identifying a second allowable route for the second user within the terminal, the second routing map based on the second role;
wherein the second role for the second user differs from the role for the user; and
wherein the second routing map differs from the routing map.

4. The method of claim 3, further comprising:
granting the second user access to one or more second restricted areas in the terminal, the one or more second restricted areas located along the second allowable route in the second routing map;
wherein the one or more second restricted areas differ from the one or more restricted areas.

5. The method of claim 1, further comprising:
providing a second routing map to the mobile device associated with the user, the second routing map identifying a second allowable route for the user within the terminal, the second routing map based on the role; and
granting the user access to one or more second restricted areas in the terminal, the one or more second restricted areas located along the second allowable route in the second routing map.

6. The method of claim 1, wherein the allowable route for the user within the terminal is based on an objective to be achieved by the user in the terminal.

7. The method of claim 1, wherein the role for the user comprises one of: a terminal operator, a technician, a manager, an administrator, and a driver.

8. An apparatus comprising:
at least one processor configured to:
responsive to identifying a user in a cargo transporting vehicle entering a terminal that includes a plurality of storage tanks that each store cargo, where the cargo from the plurality of storage tanks is configured for unloading from and loading onto the cargo transporting vehicle, identify a role for the user;
wirelessly provide a routing map to a mobile device configured for a global positioning system (GPS) including GPS signaling associated with the user, the routing map identifying an allowable route for the user within the terminal, the routing map based on the role;
grant the user access to one or more restricted areas in the terminal, the one or more restricted areas located along the allowable route in the routing map, wherein the one or more restricted areas includes bays where cargo from the cargo transporting vehicle is loaded or removed, and using the GPS signaling from the mobile device, monitoring a location of the user.

9. The apparatus of claim 8, wherein the at least one processor is further configured to:

wherein the monitoring the location of the user is used to identify a deviation of the user from the allowable route; and responsive to identifying the deviation, generate an alarm.

10. The apparatus of claim 8, wherein the at least one processor is further configured to:

responsive to identifying a second user entering the terminal, identify a second role for the second user; and provide a second routing map to a second mobile device associated with the second user, the second routing map identifying a second allowable route for the second user within the terminal, the second routing map based on the second role;

wherein the second role for the second user differs from the role for the user; and wherein the second routing map differs from the routing map.

11. The apparatus of claim 10, wherein the at least one processor is further configured to:

grant the second user access to one or more second restricted areas in the terminal, the one or more second restricted areas located along the second allowable route in the second routing map;

wherein the one or more second restricted areas differ from the one or more restricted areas.

12. The apparatus of claim 8, wherein the at least one processor is further configured to:

provide a second routing map to the mobile device associated with the user, the second routing map identifying a second allowable route for the user within the terminal, the second routing map based on the role; and grant the user access to one or more second restricted areas in the terminal, the one or more second restricted areas located along the second allowable route in the second routing map.

13. The apparatus of claim 8, wherein the allowable route for the user within the terminal is based on an objective to be achieved by the user in the terminal.

14. A non-transitory computer readable medium containing instructions that when executed cause at least one processing device to:

responsive to identifying a user in a cargo transporting vehicle entering a terminal that includes a plurality of storage tanks that each store cargo, with a cargo from the plurality of storage tanks is configured for unloading from and loading onto the cargo transporting vehicle, identify a role for the user;

wirelessly provide a routing map to a mobile device configured for a global positioning system (GPS) including GPS signaling associated with the user, the routing map identifying an allowable route for the user within the terminal, the routing map based on the role;

grant the user access to one or more restricted areas in the terminal, the one or more restricted areas located along the allowable route in the routing map, wherein the one or more restricted areas includes bays where cargo from the cargo transporting vehicle is loaded or removed, and using the GPS signaling from the mobile device, monitoring a location of the user.

15. The non-transitory computer readable medium of claim 14, further containing instructions that when executed cause the at least one processing device to:

wherein the monitoring the location of the user is used to identify a deviation of the user from the allowable route; and responsive to identifying the deviation, generate an alarm.

16. The non-transitory computer readable medium of claim 14, further containing instructions that when executed cause the at least one processing device to:

responsive to identifying a second user entering the terminal, identify a second role for the second user; and provide a second routing map to a second mobile device associated with the second user, the second routing map identifying a second allowable route for the second user within the terminal, the second routing map based on the second role;

wherein the second role for the second user differs from the role for the user; and wherein the second routing map differs from the routing map.

17. The non-transitory computer readable medium of claim 16, further containing instructions that when executed cause the at least one processing device to:

grant the second user access to one or more second restricted areas in the terminal, the one or more second restricted areas located along the second allowable route in the second routing map;

wherein the one or more second restricted areas differ from the one or more restricted areas.

18. The non-transitory computer readable medium of claim 14, further containing instructions that when executed cause the at least one processing device to:

provide a second routing map to the mobile device associated with the user, the second routing map identifying a second allowable route for the user within the terminal, the second routing map based on the role; and grant the user access to one or more second restricted areas in the terminal, the one or more second restricted areas located along the second allowable route in the second routing map.

* * * * *